United States Patent [19]

Moseley

[11] Patent Number: 5,275,526

[45] Date of Patent: Jan. 4, 1994

[54] TRUCK FREIGHT LOADING AND DOCK DEVICE

[75] Inventor: John F. Moseley, Ormond Beach, Fla.

[73] Assignee: Superior Handling Equipment, Inc., Ormond Beach, Fla.

[21] Appl. No.: 871,128

[22] Filed: Apr. 20, 1992

[51] Int. Cl.⁵ .............................................. B65G 69/32
[52] U.S. Cl. .................................... 414/495; 414/537; 414/917; 187/9 R
[58] Field of Search ............... 414/495, 537, 540, 917; 187/9

[56] References Cited

U.S. PATENT DOCUMENTS

| | | | |
|---|---|---|---|
| 2,377,279 | 5/1945 | Stewart | 414/495 |
| 3,096,895 | 7/1963 | Kappen | 414/495 X |
| 3,220,698 | 11/1965 | Carder | 414/495 X |
| 3,848,749 | 11/1974 | Anderson et al. | 414/917 X |
| 4,488,326 | 12/1984 | Cherry | 414/495 X |
| 4,701,097 | 10/1987 | Sturtz | 414/495 |
| 4,946,330 | 8/1990 | Pederson et al. | 414/917 X |
| 4,971,510 | 11/1990 | Houle | 414/537 X |
| 4,978,272 | 12/1990 | Leon | 414/495 X |

Primary Examiner—Frank E. Werner
Assistant Examiner—Stephen T. Gordon
Attorney, Agent, or Firm—Arthur G. Yeager; Earl L. Tyner

[57] ABSTRACT

Wheeled elevator apparatus for use in loading and unloading freight into and out of a highway truck; the apparatus including a platform raised and lowered by hydraulic power engaging lever arms arranged in a parallelogram structure, drawbridge access ways from the platform to the truck bed and from the platform to the loading/unloading level, the access directions being perpendicular to each other, wheels for moving the apparatus from place to place, and jacks for securing the apparatus off its wheels.

9 Claims, 2 Drawing Sheets

TRUCK FREIGHT LOADING AND DOCK DEVICE

TECHNICAL FIELD OF THE INVENTION

This invention relates to a wheeled elevatable platform for use in loading and unloading freight into and from highway trucks to and from loading levels different from the level of the truck bed.

BACKGROUND OF THE INVENTION

Highway freight trucks are widely used throughout the world for transporting goods of all types from one place to another. Because the bed of the truck is so high above ground level, e.g., about four feet, it is a normal procedure to load and unload such trucks from a dock that is about the same height above ground level as the truck bed. The dock usually is part of a warehouse that can be locked to protect the goods waiting to be loaded onto a truck as well as the goods unloaded from a truck. It is not always feasible to have a freight loading dock as a part of a building and at the same level as the truckbed. Accordingly, other means have been developed for assistance in loading and unloading freight from such trucks. One such means is to employ a folding tailgate on the truck which can be raised or lowered like an elevator. Another means is to employ a movable platform that can be placed alongside a truck such that freight can be transferred from the truck to the platform or vice versa. The movable platform can then raise or lower the freight to whatever elevation is desired for another location or lowered to ground unloading the freight from the platform. I have developed and marketed for the last few years such a movable elevatable platform having two aligned access ramps on the front and back, respectively, of the platform. One ramp provides access from the platform to an unloading level, which may be at ground level or at any selected elevation up to the maximum height of about five feet. The loading/unloading travel of the freight handler is substantially a straight line from truck bed to platform to unloading level. While this straight line travel across the ramp is appropriate for most situations, there are many occasions where it would be desirable to travel from the truck to the platform and then turn right or left and move perpendicular to the previous travel direction to travel from the platform to the unloading level, or vice versa for loading.

It is an object of this invention to provide a novel freight loading and unloading elevator platform having the lifting arms in a parallelogram arrangement. It is another object of this invention to provide such a novel mobile freight loading elevator platform having two folding access ramps providing travel onto and off of the platform in directions perpendicular to each other. Still other objects will become apparent from the more detailed description which follows.

BRIEF SUMMARY OF THE INVENTION

This invention relates to a movable freight lifting elevator for use in loading and unloading highway trucks which comprises an elevatable rectangular platform mounted on a wheeled carriage having a plurality of jacks for selectively lifting the carriage off the carriage wheels to make it immovable, a hinged first drawbridge member that is pivotable from a vertical inoperable storage position to an operational horizontal bridge floor between said platform and the truck bed; a hinged second drawbridge member that is pivotable from a vertical inoperable storage position to an operational horizontal bridge floor between said platform and a loading/unloading floor, the direction of travel for loading and unloading over said first drawbridge member being perpendicular to the direction of travel for loading and unloading over said second drawbridge member.

In preferred embodiments of this invention, the platform is elevated by hydraulic cylinder power applied to two pairs of parallel pivotable lifting arms, the lower one of each pair connected to each other by a torque tube; and the chassis of the elevator is a structural beam in the shape of a hollow rectangle extending around the perimeter of the platform except for an opening in that rectangle immediately below the access ramp leading from the platform to the loading level.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
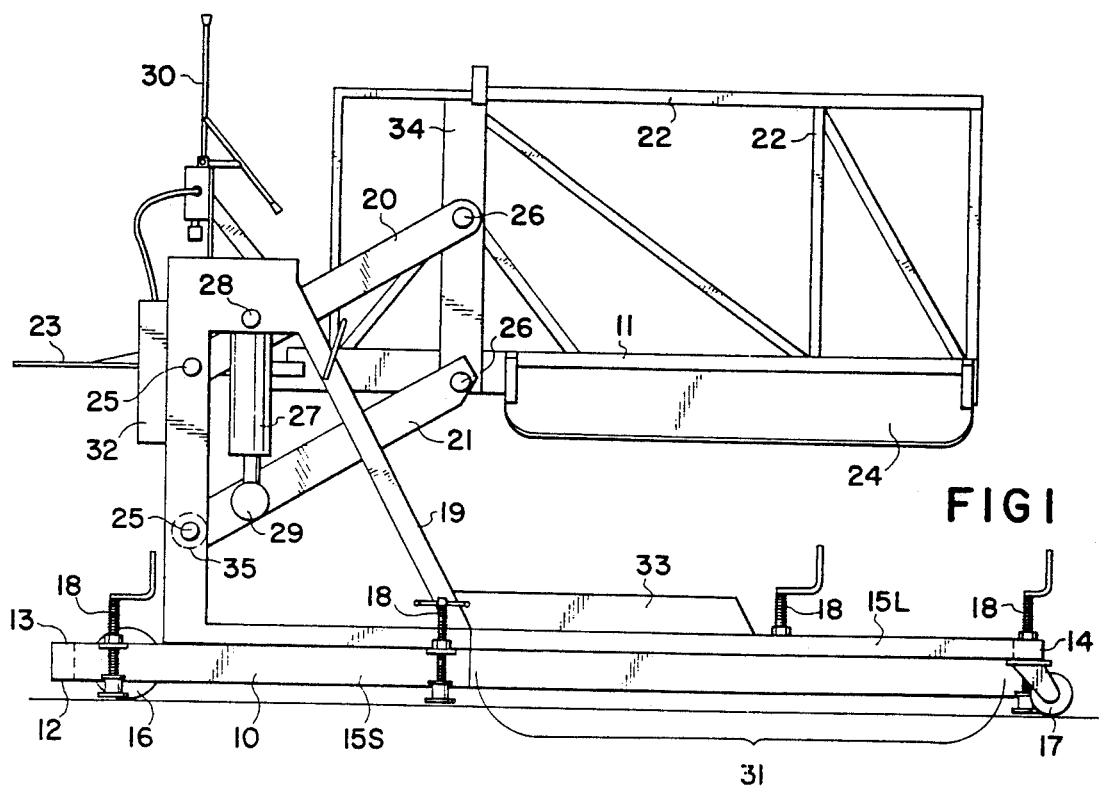
FIG. 1 is a side elevational view of the elevator of this invention in the raised position.
Figure 2:
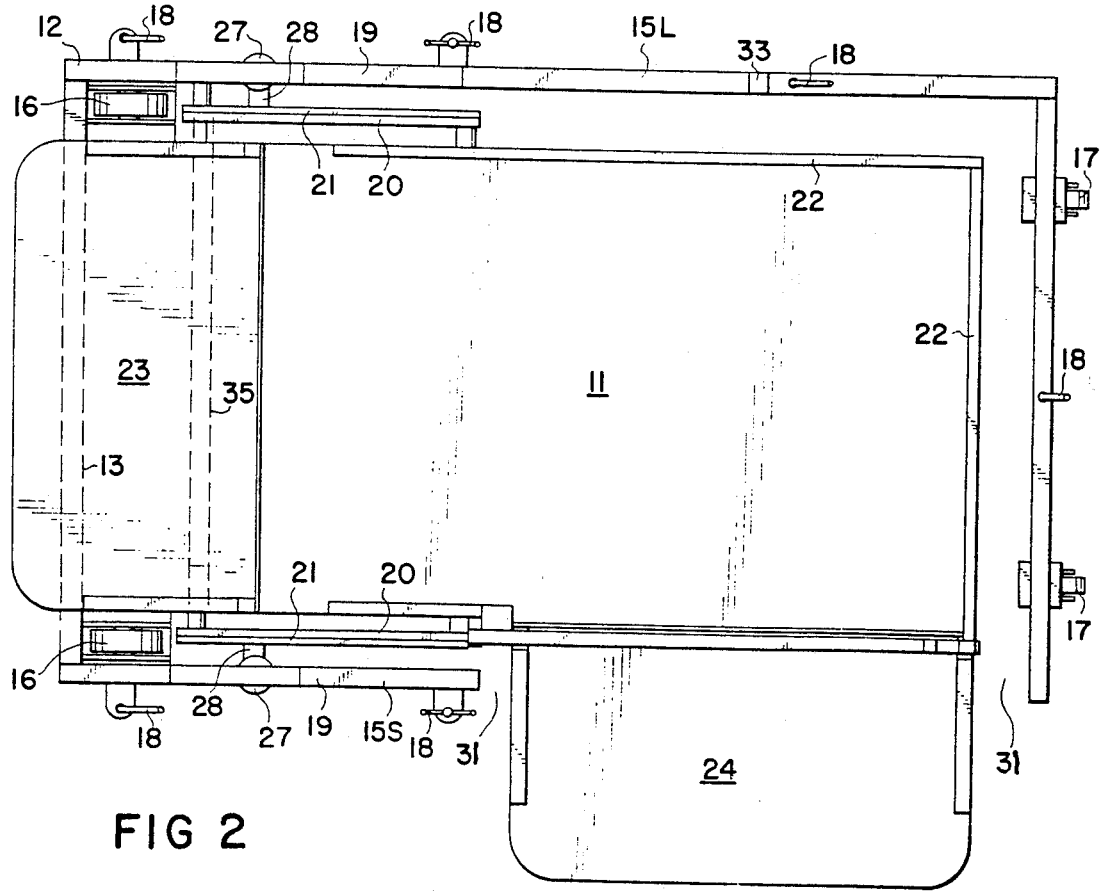
FIG. 2 is a plan view of the elevator shown in FIG. 1.
Figure 3:
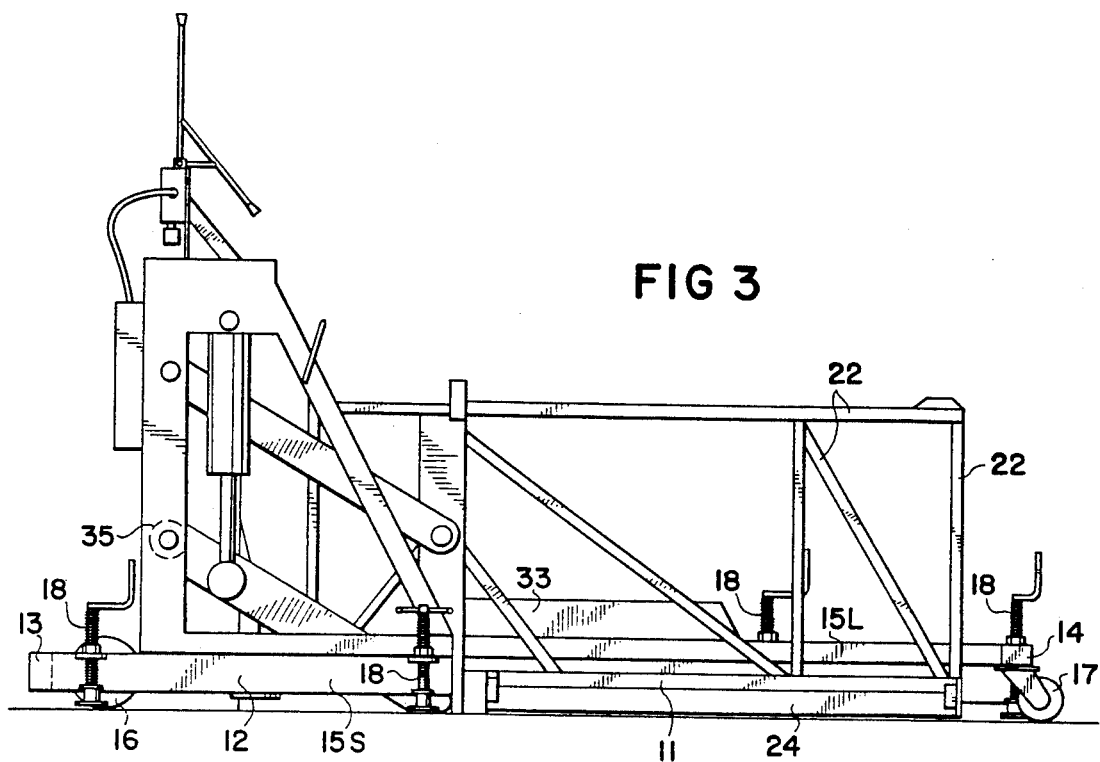
FIG. 3 is a side elevational view of the elevator of this invention in the lowered position.
Figure 4:
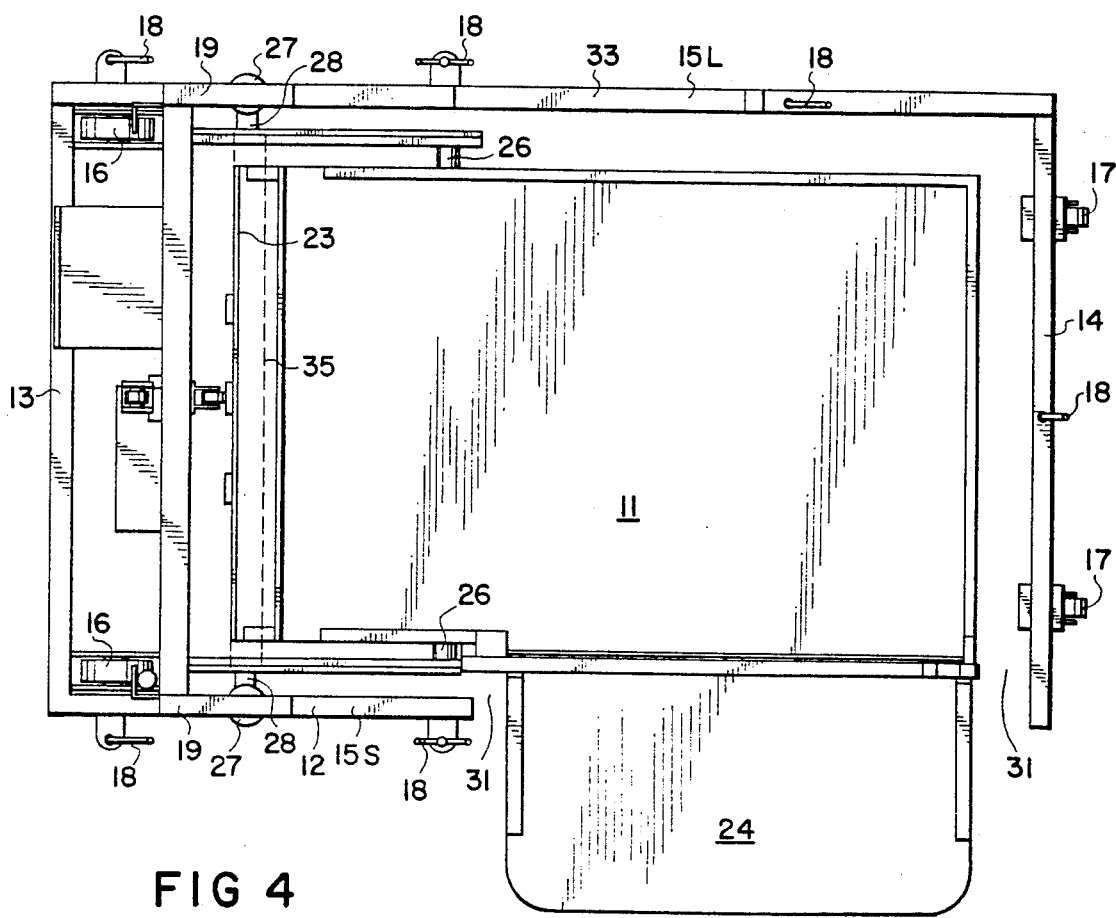
FIG. 4 is a plan view of the elevator of FIG. 3.

The features of the elevator of this invention are best understood by reference to the attached drawings.

The elevator apparatus includes a carriage 10 mounted on wheels 16 and 17, so as to be movable over the ground or other generally horizontal floor, such as the loading level of a dock attached to a warehouse. Mounted on carriage 10 is a rectangular elevator platform 11 which can be raised or lowered while always remaining in a horizontal position.

The basic lower portion of carriage 10 is a chassis 12, which is a plurality of structural beams arranged in a generally hollow rectangular shape around the perimeter of the rectangular platform 11. The structural beams in the rectangular shape are rear beam 13, front beam 14, and two side beams 15. Short side beam 15S is on the same side as ramp 24 and long side beam 15L is on the side opposite to ramp 24. There is a single interruption in the hollow rectangle where no structural beam exists. That is immediately under ramp 24, about which more will be described below.

Chassis 12 functions as a support for a plurality of wheels 16 and 17 and a plurality of jacks 18. Preferably there are four wheels, two of which are rear wheels 16 and two of which are front wheels 17. The rear wheels 16 are on the rear of the elevator apparatus, which is the end adjacent to the truck to be loaded or unloaded. Correspondingly, the front wheels 17 are on the front of the elevator apparatus, which is the side farthest away from the truck. Generally rear wheels 16 are fixed direction wheels rolling lengthwise, that is in the direction toward the front or the rear of the elevator apparatus. Front wheels 17 are preferably mounted on swivels so as to turn in any direction of travel. Jacks 18 are preferably six in number, three of which are spaced along the long side of chassis 12, i.e., the side opposite to ramp 24. Two of the jacks 18 are spaced along the short side of chassis 12, i.e., the same side as that occupied by ramp 24. One of jacks 18 is placed generally in the middle of the front side of chassis 12, i.e., about half way between front wheels 17. Jacks 18 are shown as having screw thread shafts engaging a stationary nut fixture on chassis 12. Each jack 18 is manually operable by a suitable handle and is capable of elevating chassis 12 sufficiently to lift chassis 12 high enough that there is no contact between wheels 16 and 17 and the ground or floor the apparatus rolls over. By using a suitable combination of jacks 18, the entire elevator apparatus can be stabilized, immobilized, and leveled. Shock absorbing pad 32 on the rear of chassis 12 projects rearwarldy sufficiently to be the first portion of the carriage 10 to contact the rear of the truck to be serviced thereby.

On each lateral side of carriage 10 adjacent rear wheels 16 is a vertical superstructure 19 resting on chassis 12. Superstructure 19 is generally trapezoidal in shape and serves as a support for platform 11 and the levers and pivots employed in raising and lowering platform 11. The operations of raising and lowering platform 11 are based on two pairs of parallel arms 20 and 21 which are pivoted at their rear ends by pivot pins 25 in a vertical beam of superstructure 19, and pivoted at their forward ends by pivot pins 26 in vertical beam 34 of platform 11. A line through pins 25 is parallel to a line through pins 26. Furthermore, the two arms 21 are connected to each other by a torque tube 35 connecting arms 21 by a rigid torque tube concentric to lower pins 25, although the tube may be connected in other ways to both of arms 21 or both of arms 20. The arrangement of parallel arms 20 and 21 and their pivot locations produces the well known parallelogram structure which assures that platform 11 will remain horizontal at all elevation positions of arms 20 and 21.

The power to move arms 20 and 21 and thereby elevate platform 11 is provided by one or more hydraulic cylinder means 27, preferably one on each side, respectively, of platform 11. The upper end of cylinder means 27 is pivoted at pin 28, mounted in superstructure 19, while the lower end of cylinder means 27 is pivoted at pin 29 mounted in lower arm 21. Left and right arms 21 are connected together by torque tube 35 which synchronizes arms 21 and thereby maintains platform 11 level at all positions.

The elevator apparatus of this invention has two access ramps 23 and 24 to provide access, respectively, between platform 11 and the truck bed, and platform 11 and the loading level. Each of ramps 23 and 24 is attached to an edge of platform 11 by a hinge such that each ramp may be pivoted to a vertical position for storage purposes and to a horizontal, or slightly below horizontal, position to function as an operational bridge from the platform 11 to the truck bed or the loading level. Ramps 23 and 24 are pivotable by hydraulic power or manual power as desired. It is a special feature of this invention that ramp 24, which provides a passageway between the platform 11 and the loading level, opens to the side of platform 11, either the right or left side.

The elevator apparatus with a side opening ramp 24 has quite different stresses and balance problems than does the apparatus with a front opening ramp as is known in the prior art. In the latter case, the freight being loaded or unloaded moves in a relatively straight line over the center of platform 11 and balancing problems are not critical items to consider. In the case of the apparatus of this invention, however, the freight moving over side access ramp 24 tends to tip the apparatus in the direction of ramp 24, and places great stresses on the carriage 10 and chassis 12. The stress problems are met by employing larger beams in chassis 12, side superstructures 19, and associated portions of the apparatus. Reinforcement beam 33 on long side beam 15L is typical of such additional support. The structure of chassis 12 in the shape of a rectangle around the perimeter of platform 11 also helps to solve the balance problems. Of course, the structural beams in chassis 12 cannot be continuous because they must not interfere with the presence of ramp 24 in its extended horizontal position which is required for the smooth loading or unloading of freight with minimal inclination of the ramps. Therefore, there is a discontinuity 31 in the beams of chassis 12, and that discontinuity 31 is exactly where it would meet ramp 24. Under ramp 24 there is no chassis 12 beam. The extension of front beam 14 of the rectangular chassis to the corner near ramp 24 helps to provide the necessary support and stability for the elevator apparatus. Other portions of chassis 12 and superstructures 19 are also made of beams of the necessary size to provide rigidity and support for the apparatus in its usage.

Platform 11 is provided with a suitable railing structure 22 to keep people and freight from falling off the platform. As a part of the railing there are two vertical support beams (one on each side) which are large enough to provide seats for pivot pins 26. The control levers 30 for operating hydraulic cylinders 27 are preferably mounted on railing 22.

The materials of construction for the apparatus of this invention may be any of several strong materials, e.g., metals, reinforced plastic, or wood; however, steel is preferred.

While the invention has been described with respect to certain specific embodiments, it will be appreciated that many modifications and changes may be made by those skilled in the art without departing from the spirit of the invention. It is intended therefore, by the appended claims to cover all such modifications an changes as fall within the true spirit and scope of the invention.

What is claimed as new and what it is desired to secure by Letters Patent of the United States is:

1. A movable freight lifting elevator for use in loading and unloading highway trucks which comprises an elevatable rectangular platform mounted on a wheeled carriage having a plurality of jacks for selectively lifting the carriage off the carriage wheels to make it immovable, a hinged first ramp member that is pivotable from a vertical inoperable storage position to an operational horizontal bridge floor position between said platform and a truck bed; a hinged second ramp member that is pivotable from a vertical inoperable storage position to an operational horizontal bridge floor position between said platform and a loading/unloading floor, a direction of travel for loading and unloading over said first ramp member being perpendicular to a direction of travel for loading and unloading over said second ramp member, said platform and said carriage being joined by two pair of parallel lifting arms, pivoted at one end thereof from said carriage and pivoted at the other end thereof from said platform, said pairs of arms being on opposite sides of said platform and of said first ramp member, and a horizontal torque tube rigidly connected at each end thereof to a corresponding arm of said pairs of arms on each said opposite side of said platform.

2. The elevator of claim 1 wherein said platform is moved vertically by hydraulic power cylinder means.

3. The elevator of claim 1 wherein said carriage includes a hollow rectangular chassis of structural beam members extending around the front, the back, and two sides of the perimeter of said platform except for a portion immediately under said second ramp member, four small diameter wheels for rolling said carriage on the ground and which are located respectively adjacent the four corners of said rectangular chassis, said plurality of adjustable jacks mounted in said structural beam members and adapted to raise said chassis to an elevation wherein said wheels are suspended above ground level, a superstructure on each of said two sides and adjacent said back and supporting lateral pivot pins for said first ramp member, and for said two pairs of arms, and hydraulic cylinder means connecting said superstructure to one said pair of arms for raising and lowering said platform.

4. The elevator of claim 3 wherein said adjustable jacks are extended or retracted with respect to said structural beam members by screw thread means.

5. The elevator of claim 1 wherein said platform includes a floor and a safety restraining railing projecting upwardly from said platform floor around the perimeter of said platform except at the locations of said ramp members.

6. The elevator of claim 3 which additionally includes a shock absorbing pad mounted on said carriage at an elevation substantially the same as the elevation of rear bumpers of a highway truck to be serviced by said elevator.

7. An apparatus for use in loading freight into and unloading freight out of a highway truck, comprising a carriage which is movable about on a horizontal floor of a loading area, has a horizontal platform that is raised and lowered by hydraulic power, and has two pivotable ramp members providing horizontal extensions to said platform to provide access from said truck to said platform and from said platform to said horizontal floor, said horizontal extensions being at a right angle to each other; said carriage including as a supporting chassis a structural beam formed into a hollow rectangle with an opening in the rectangle immediately under one said ramp member providing access to said horizontal floor, a plurality of spaced wheels depending downwardly from said structural beam and adapted to provide locomotion to said apparatus, and a plurality of spaced screw thread manually operable jacks depending downwardly from said structural beam and adapted to provide stationary support for said apparatus; said carriage also including two vertical parallel superstructures resting on and extending upwardly from said structural beam on opposite sides of said platform and supporting a plurality of lateral pivot pins providing pivotable support for one said ramp member providing access to said truck and providing pivotable support for two pairs of parallel arms respectively on opposite sides of said platform with one end of each arm pivotably attached to said platform and the other end of each arm pivotably attached to said respective superstructure, and hydraulic power means connected to said superstructure and said arms and adapted to selectively raise and lower said platform while maintaining it in a horizontal position at all times two of said parallel arms being connected by a torque tube.

8. The apparatus of claim 7 wherein said ramp members are raised and lowered manually.

9. The apparatus of claim 7 wherein said chassis has four right angle corners and one of said wheels located adjacent each said corner respectively.

* * * * *